(12) United States Patent
Lakshmanan et al.

(10) Patent No.: US 9,115,419 B2
(45) Date of Patent: Aug. 25, 2015

(54) PROCESS FOR EXTRACTION OF RARE EARTH ELEMENTS

(71) Applicant: Process Research Ortech Inc., Mississauga (CA)

(72) Inventors: Vaikuntam I. Lakshmanan, Mississauga (CA); Ramamritham Sridhar, Oakville (CA); M. A. Halim, Mississauga (CA)

(73) Assignee: PROCESS RESEARCH ORTECH INC., Mississauga, Ontario (CA)

( * ) Notice: Subject to any disclaimer, the term of this patent is extended or adjusted under 35 U.S.C. 154(b) by 156 days.

(21) Appl. No.: 13/858,166

(22) Filed: Apr. 8, 2013

(65) Prior Publication Data
US 2013/0283977 A1 Oct. 31, 2013

Related U.S. Application Data

(60) Provisional application No. 61/621,632, filed on Apr. 9, 2012, provisional application No. 61/670,792, filed on Jul. 12, 2012.

(51) Int. Cl.
| | |
|---|---|
| C22B 59/00 | (2006.01) |
| C22B 3/08 | (2006.01) |
| C22B 3/10 | (2006.01) |

(52) U.S. Cl.
CPC . *C22B 59/00* (2013.01); *C22B 3/08* (2013.01); *C22B 3/10* (2013.01)

(58) Field of Classification Search
CPC .............. C22B 3/10; C22B 3/08; C22B 59/00
USPC .............................. 75/743; 423/21.1; 210/634
See application file for complete search history.

(56) References Cited

U.S. PATENT DOCUMENTS

| | | | |
|---|---|---|---|
| 8,420,048 B1 * | 4/2013 | Raman et al. .............. | 423/658.5 |
| 2008/0302671 A1 * | 12/2008 | Pearce et al. .................. | 205/571 |

FOREIGN PATENT DOCUMENTS

| | | | |
|---|---|---|---|
| JP | 2006063413 A | * | 3/2006 |
| JP | 2010174366 A | * | 8/2010 |
| WO | WO 2011156861 A1 | * | 12/2011 |

OTHER PUBLICATIONS

Machine translation of JP 2010-174366 published Aug. 2010.*

*Primary Examiner* — George Wyszomierski
*Assistant Examiner* — Tima M McGuthry Banks
(74) *Attorney, Agent, or Firm* — Tarolli, Sundheim, Covell & Tummino LLP

(57) ABSTRACT

A process for the extraction of rare earth elements, including yttrium, from a rare earth element-bearing ore or concentrate, comprising the steps of leaching the rare earth element-bearing ore or concentrate with a lixiviant of hydrochloric acid and magnesium chloride at atmospheric pressure at a temperature of from 90° C. to the boiling point of the solution and at an Eh of at least 200 mV. After a liquid/solids separation step, the solution obtained is subjected to steps for removal of iron and for recovery of rare earth elements. Alternatively, rare earth element-bearing ore or concentrate may be leached with sulphuric acid and liquid obtained subjected to extraction of iron and other impurities. Raffinate obtained may be treated with oxalic acid, the precipitate dissolved in hydrochloric acid and subjected to solvent extraction for rare earth elements or the raffinate may be subjected to solvent extraction for removal of rare earth elements and then stripped with hydrochloric acid.

11 Claims, 1 Drawing Sheet

Process flow diagram.

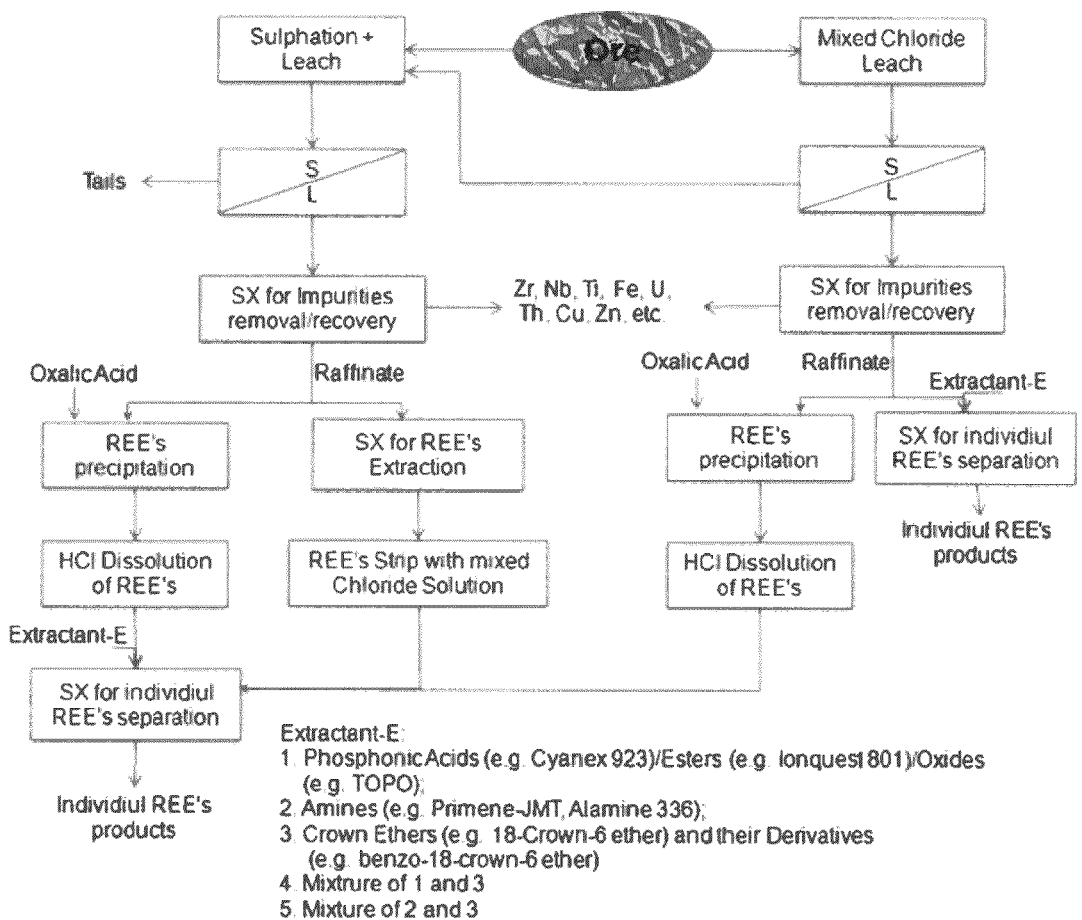
Process flow diagram.

PROCESS FOR EXTRACTION OF RARE EARTH ELEMENTS

REFERENCE TO RELATED APPLICATIONS

This application claims priority under 35 USC 119(e) from U.S. Provisional Patent Application No. 61/621,632 filed Apr. 9, 2012 and U.S. Provisional Patent Application No. 61/670,792 filed Jul. 12, 2012.

FIELD OF THE INVENTION

The present invention relates to the leaching and recovery of rare earth elements, including yttrium, from ores or concentrates of rare earth elements, using a mixed chloride lixiviant. In particular, the invention relates to a process for the leaching of rare earth elements from a rare earth element-bearing ore or concentrate with a lixiviant comprising hydrochloric acid and magnesium chloride. In embodiments, the invention relates to a process for the leaching and recovery of one or more rare earth elements from a rare earth element-bearing ore or concentrate with a lixiviant comprising hydrochloric acid and magnesium chloride, followed by solvent extraction to remove iron from the leachate liquid and if necessary other elements that may be present e.g. niobium or zirconium, and then by steps to recover rare earth elements and yttrium. Lixiviant, extractant and other materials used in the process may be recovered and recycled. As exemplified, very high levels of extraction and recovery of rare earth element may be achieved. The ore or concentrate may also be subjected to leaching with sulphuric acid and a raffinate subsequently obtained treated with oxalic acid and redissolved in hydrochloric acid or subjected to solvent extraction and stripped with hydrochloric acid. Rare earth elements may then be extracted.

BACKGROUND TO THE INVENTION

The rare earth (or lanthanide) series of elements are those with atomic numbers 57 to 71 viz La, Ce, Pr, Nd, Pm, Sm, Eu, Gd, Tb, Dy, Ho, Er, Tm, Yb and Lu, respectively. Yttrium (Y, atomic number 39) is closely allied chemically. The rare earth elements are actually not as rare as implied by the name as cerium is more abundant than tin, yttrium more abundant than lead and all of the lanthanides are more plentiful than platinum group metals. The rare earth metal elements have a wide variety of uses, including as catalysts, in hardening alloys, glass additives, magnetic materials, phosphors, lasers, opthamalic lenses and optical fibers. Rare earth minerals are found in many forms, including oxides and multiple oxides, fluorides, carbonates and fluorocarbonates, silicates and phosphates.

Processes for the recovery of rare earth elements are known. Canadian Patent 1329486 of M. Matsua et al, issued 17 May 1994, discloses contacting a strongly acid solution of rare earth elements with a chelate resin having phosphorus-atom containing functional group. Canadian Patents 1217637 of P. Mein, issued 10 Feb. 1987, and 2015057 of K. S. Pisarcyzk at al, issued 27 Jul. 1999, describe digestion of pollucite with hydrochloric acid to obtain a solution of metal chlorides including cesium chloride. Canadian Patent 2021415 of G. D. Fulford et al, published 19 Jan. 1991, describes recovery of rare earth elements from sulphurous acid solution. Canadian Patent 1040756 of P. Broman at al, issued 17 Oct. 1978, describes use of flotation processes. Canadian Patent 2631190 of S. J. Mackowski et al, published 2 Nov. 2009, describes pre-leaching a composite ore of monazite and apatite minerals using an acid to substantially dissolve the apatite.

In other mining industries, processes have been developed to extract value metals e.g. nickel and titanium, with recycling of solutions used in the process and with substantially reduced environmental issues. One example is the use of solutions of hydrochloric acid and magnesium chloride in the extraction of titanium from titanium-bearing ores or concentrates at low temperatures, as disclosed in U.S. Pat. No. 7,803,336 of V. I. Lakshmanan, R. Sridhar et al, issued 28 Sep. 2010. U.S. Pat. No. 7,736,606 of V. I. Lakshmanan, R. Sridhar et al, issued 15 Jun. 2010, describes extraction of base metal sulphide ores with a lixiviant of a chloride, an oxidant and hydrochloric acid. The leaching may be conducted to limit the co-dissolution of platinum group metals and gold with the base metals.

Processes that are effective for the recovery of rare earth elements from rare earth element-bearing ores or concentrates and which have low or minimal environmental issues would be beneficial. Such processes should include potential for recycling of components used in the process so as to reduce environmental issues and for economic operation of the process. In addition, processes should be capable of separating rare earth elements from other value metals in leaching steps. There is a particular need for such processes in the rare earth element mining industry.

SUMMARY OF THE INVENTION

In an aspect, the present invention provides a process for the leaching and recovery of rare earth elements, including yttrium, from rare earth element-bearing ore or concentrate in which solutions used in various stages of the process may be recycled. In particular, the process utilizes chloride chemistry in the leaching step. In a further aspect, the present invention provides a process for the leaching and recovery of rare earth elements, including yttrium, using chloride chemistry in the leaching step and in which the leaching step is followed by steps to remove iron prior to recovery of rare earth elements.

Accordingly, the present invention provides a process for the extraction of at least one rare earth element from a rare earth element-bearing ore or concentrate, comprising the steps of:

a) leaching the rare earth element-bearing ore or concentrate with a lixiviant of hydrochloric acid and magnesium chloride at atmospheric pressure at a temperature of from 90° C. to the boiling point of the solution and an Eh of at least 200 mV; and b) subjecting the leach solution so obtained to a liquid/solids separation step.

In a preferred embodiment, liquid from step b) is subjected to steps for recovery of at least one rare earth element or yttrium.

In another embodiment, the Eh is at least 400 mV.

In a further embodiment, the rare earth element is selected from at least one rare earth element of atomic number 57-71. In another embodiment, yttrium is recovered.

The present invention also provides a process for the extraction of at least one rare earth element from a rare earth element-bearing ore or concentrate, comprising the steps of a) leaching the rare earth element-bearing ore or concentrate with a lixiviant of hydrochloric acid and magnesium chloride at atmospheric pressure at a temperature of from 90° C. to the boiling point of the solution and an Eh of at least 200 mV;

b) subjecting the leach solution so obtained to a liquid/solids separation step;

c) subjecting the liquid from the liquid/solids separation of step b) to a solvent extraction step for removal of iron;

d) subjecting the raffinate obtained from step c) to a solvent extraction step to remove zirconium from the raffinate; and e) subjecting raffinate from step d) to steps to separate at least one of a rare earth element and yttrium.

In a preferred embodiment, in step e), the raffinate is treated with oxalic acid to precipitate a compound of the at least one of the rare earth element and yttrium.

In a further embodiment, in step a), the Eh is at least 400 mV.

In another embodiment, the precipitate obtained is redissolved and the resulting solution is treated for recovery of at least one of a rare earth element and yttrium.

In an alternative embodiment of the invention, the ore of rare earth elements or concentrate thereof may be subjected to a leach using sulfuric acid, followed by solids/liquid separation. Accordingly, in another embodiment of the invention, there is provided a process the extraction of at least one rare earth element from a rare earth element-bearing ore or concentrate, comprising the steps of:

a) leaching the rare earth element-bearing ore or concentrate with a lixiviant of hydrochloric acid and magnesium chloride at atmospheric pressure at a temperature of from 90° C. to the boiling point of the solution and an Eh of at least 200 mV; and b) subjecting the leach solution so obtained to a liquid/solids separation step.

BRIEF DESCRIPTION OF THE DRAWINGS

FIG. 1 shows a process flow diagram of embodiments of the invention.

DETAILED DESCRIPTION OF THE INVENTION

The present invention relates to a process for leaching of rare earth elements from a rare earth element-bearing ore or concentrate. The rare earth (or lanthanide) series of elements are those with atomic numbers 57 to 71 viz La, Ce, Pr, Nd, Pm, Sm, Eu, Gd, Tb, Dy, Ho, Er, Tm, Yb and Lu, respectively. Yttrium (Y, atomic number 39) is closely allied chemically and is included therein with respect to the process of the present invention. The rare earth element-bearing ore or concentrate is leached with a lixiviant of hydrochloric acid and magnesium chloride under conditions such that the rare earth elements are leached into solution. After a solids/liquids separation step, steps may be taken to remove iron present in leachate solution. Subsequently, steps may be taken to recover rare earth elements. The hydrochloric acid and magnesium chloride of the lixiviant may be recovered and recycled to the leaching step. The process in present invention is illustrated in FIG. 1.

The present invention particularly relates to a process for leaching of rare earth element-bearing ores or concentrates. Such ores may contain iron. The process is operated at atmospheric pressure. While the concentration of hydrochloric acid may be varied, the preferred concentration of hydrochloric acid is not more than about 20% (mass ratio). Such a concentration of acid may be obtained by azeotropic distillation of hydrochloric acid solution, for example in recycle of hydrochloric acid solution in the process e.g. using pyrohydrolysis. As discussed herein, such a low concentration of hydrochloric acid provides advantages to the process, including in recycle steps in the process and in requirements for disposal of effluent.

The rare earth element-bearing ore material may be ore per se, but is preferably a concentrate thereof. Techniques for treating rare earth element-bearing ore to form a concentrate or for beneficiation of the ore are known. The ore may also be in the form of tailings from another process. Flotation processes may be used to obtain concentrates for the process of the present invention. It is understood that the expression "ore" also includes any other form of the ore, and that mixtures of the various forms of the ore may be used. In particular embodiments of the invention, the process is operated on tailings, waste or other material obtained from another process. The process may also be operated on refined or other products that are relatively high in rare earth element content. Other sources will be apparent to persons skilled in the art. The material fed to the process should be comminuted or ground to improve the contact between lixiviant and rare earth elements to be leached. All of these forms are regarded as ore or concentrate to be fed to the process.

The process may be operated with or without roasting or reduction of the ore. However, in embodiments, the ore or concentrate may have been subjected to roasting or calcination.

In the method of the present invention, ore in a form as discussed above is fed to a leaching step in which the ore is contacted and leached with a lixiviant comprising magnesium chloride and hydrochloric acid, optionally also containing an oxidant Regeneration and recycling of ingredients used in the leach and in subsequent extraction and recovery steps is an important aspect of the process; use of other chlorides or mixtures of chlorides e.g. alkali metal chlorides, may adversely affect such recovery and recycling. Thus, the lixiviant is restricted to hydrochloric add and with magnesium chloride as the only added metal chloride, with oxidant to obtain the Eh (electric potential) versus SHE (standard hydrogen electrode) levels discussed herein. Such oxidant is selected from the group consisting of alkali metal peroxide, alkali metal perchlorate, ammonium perchlorate, magnesium perchlorate, alkali metal chlorate, magnesium chlorate, alkali metal hypochlorite, chlorine, hydrogen peroxide and other non-sulphur containing oxidants, and mixtures thereof. Examples of alkali metal peroxide are sodium peroxide and potassium peroxide. Examples of alkali metal perchlorates are sodium perchlorate and potassium perchlorate. Ammonium perchlorate, magnesium perchlorate and magnesium chlorate may also be used. Examples of alkali metal chlorates are sodium chlorate and potassium chlorate. An example of an alkali metal hypochlorite is sodium hypochlorite. Other oxidants are non-sulphur containing oxidants; the presence of sulphur in oxidants is to be avoided. The preferred oxidants are chlorine and sodium chlorate.

The rare earth metals-bearing ore is subjected to a leach with a lixiviant of hydrochloric acid and magnesium chloride. The leaching may be conducted as a co-current step, a countercurrent step or in another manner, and is most conveniently carried out at atmospheric (ambient) pressure. It is not necessary to conduct the leathing step under pressure. According to the invention, the leach is carried out at a temperature in the range of from 90° C. up to the boiling point of the leaching solution, and especially at a temperature in the range of 90-110° C., In addition, the should be at least 200 mV and especially at least 400 and more particularly in the range of 400-900 mV. The leaching step is preferably carried out with a magnesium chloride concentration of at least 150 g/L, for instance 150-400 mg/L. and especially in the range of 200-

300 g/L. The hydrochloric acid used in the lixiviant has a maximum concentration of 18% (mass ratio). In embodiments, the concentration of hydrochloric acid is at least 12% and especially in the range of 14-18% (mass ratio): for instance the hydrochloric acid may be 3-6N. The chloride concentration in the lixiviant is most preferably in the range of 100-400 g/L, and especially 200-300 g/L. The Mg/HCl (magnesium to hydrochloric acid) ratio expressed in terms of mass percentage (m/m) in the leach is preferably adjusted to optimize the leach, based on for example the particular ore or concentrate being leached and temperature. The Mg/HCl ratio in the lixiviant is generally in the range of 0.1-2.0, especially 0.4-1.0. The leach may be a single stage leach or a multi-stage leach. In addition, the leaching steps may be conducted co-current or countercurrent, in whole or in part.

Subsequent to the leach, the leaching solution is subjected to a liquid/solids separation step. The leachate obtained may be treated for recovery or removal of iron. For instance, the leachate may be subjected to solvent extraction with a dialkyl ketone. In particular, the alkyl groups of the dialkyl ketone may be $C_1$-$C_6$ alkyl groups, especially $C_1$-$C_4$ alkyl groups, examples of which are methyl, ethyl, propyl and butyl including isopropyl and isobutyl. Preferred ketones are methylisobutylketone (MIBK) and diisobutylketone (DIBK). The dialkyl ketone is preferably mixed with a diluent and a modifier. Examples of the diluent are organic phase diluents, for instance kerosenes e.g. CF-231 kerosene. Examples of the modifier are alcohol surfactants e.g. EXXAL™ 13 tridecylalcohol. In an embodiment, methylisobutylketone is used in a ratio of 20/20/60 of MIBK/EXXAL™ 13 tridecyl alcohol/CF-2321 kerosene. Iron is stripped from the loaded organic solution obtained e.g. by addition of water, and may be recovered by pyrohydrolysis to give $Fe_2O_3$ which may be offered for sale. The raffinate from iron pyrohydrolysis contains hydrochloric acid and magnesium chloride which may be recycled to the leaching step. Methods for purification and recycling of such liquids are known.

The pregnant aqueous liquid obtained as a raffinate from the step for removal of iron is then subjected to steps to extract rare earth elements and yttrium. Such steps may involve solvent extraction, and will depend in particular on the rare earth or other elements in the raffinate that are to be extracted. In particular, steps may be taken to selectively separate particular rare earth elements in sequence; separation of zirconium, if present, is discussed below. Subsequently, remaining solution may be subjected to pyrohydrolysis to obtain hydrochloric acid. Solid by-product may contain, for instance, magnesium oxide and calcium oxide and/or aluminum oxide.

The raffinate from the step for the removal of iron may contain zirconium. In that situation, preferably steps are taken to extract the zirconium by solvent extraction from the raffinate prior to steps being taken to recover rare earth elements. For example, the raffinate may be subjected to solvent extraction using a phosphonic ester. An example of the phosphonic ester is 2-ethylhexyl phosphonic acid mono-2-ethylhexylester (PC-88A or Ionquest™ 801). The pregnant solvent obtained may be treated for recovery of zirconium.

Free acid should be removed from the raffinate obtained after any extraction of zirconium. Addition of an alkali leads to the presence of other cations in the raffinate. Therefore, it is preferred that free acid be removed from the raffinate by other means, especially by addition of an alcohol, for example EXXAL™ 10 branched chain alcohol to increase the pH to greater than 1.5 prior to recovery of rare earth elements.

The raffinate obtained may then be treated for recovery of rare earth elements, including yttrium. Such steps are known. For example, the raffinate may be treated with oxalic acid to effect precipitation of the rare earth elements in the form of the oxalate. The precipitated oxalate is separated in a liquid/solids separation step and may be treated for recovery of rare earth elements. For instance, the precipitate may be redissolved e.g. using hydrochloric acid and then subjected to steps to recover rare earth elements e.g. using di-(2-ethylhexyl)phosphoric acid, tributyl phosphate or an amine.

The invention has been described herein with respect to the leaching of ore containing rare earth elements using a lixiviant of hydrochloric acid and magnesium chloride, followed by solvent extraction for removal and recovery of impurities e.g. iron and zirconium, but also other elements e.g. niobium, uranium, thorium, copper and zinc. The raffinate obtained may be treated with oxalic acid to effect precipitation of rare earth elements; the resultant precipitate may be redissolved using hydrochloric acid and subjected to solvent extraction for separation of specific (or individual) rare earth elements. The solvents used for such specific solvent extraction include phosphonic acids, and esters and oxides thereof, amines, crown ethers and derivatives thereof, as well as mixtures of phosphonic acids/esters and oxides with crown ethers and their derivatives, and mixtures of amines and crown ethers and their derivatives. Mixtures of extractants may give synergistic effects with respect to extraction of rare earth elements. Crown ethers are known and have the general formula $(—CH_2CH_2O—)_n$, where the value of n may be varies, giving the crown ether different properties with respect to solvent extraction of elements. Products of specific rare earth elements may be obtained.

In an alternative embodiment of the invention, the ore of rare earth elements may be subjected to a leach using sulphuric acid, followed by a solids/liquids separation. The liquid obtained is subjected to solvent extraction for removal and recovery of impurities e.g. zirconium, niobium, iron, uranium, thallium, copper and zinc. The raffinate thus obtained may be treated with oxalic acid to effect precipitation of oxalates of rare earth elements, followed by dissolution with hydrochloric acid. The resultant solution may be subjected to solvent extraction using the extractants named above e.g. phosphonic acids, and esters and oxides thereof, amines, crown ethers and derivatives thereof, as well as mixtures of phosphonic acids/esters and oxides with crown ethers and their derivative, and mixtures of amines and crown ethers and their derivatives. As above, products of specific rare earth elements may be obtained. Alternatively, the raffinate obtained after solvent extraction for removal and recovery of impurities may be subjected directly to solvent extraction for extraction of rare earth elements and the resulting solution stripped with hydrochloric acid or a mixture of hydrochloric acid and magnesium chloride; the solution obtained may be subjected to solvent extraction for recovery of individual rare earth elements as described above.

In another embodiment, the solids obtained in solids/liquids separation after leaching of the ore with a lixiviant of hydrochloric acid and magnesium chloride may be subjected to a leach with sulphuric acid as described above, and the liquid obtained after subsequent solids/liquid separation treated as described above for the leach with sulphuric acid directly on the ore of rare earth elements.

A particular advantage of the process of the present invention, and its embodiments, is that high rates of extraction of rare earth elements are obtained in a leaching step that operates at atmospheric pressure. The use of atmospheric pressure results in substantial economic advantages, especially in capital costs. The use of chloride chemistry offers advantages in operating and capital costs of the process. Leaching agent may be regenerated and recycled, especially using a pyrohydrolysis step with additional hydrochloric acid being formed from chlorine if required. Magnesium chloride may be recycled to the leaching step.

The present invention is illustrated by the following Examples.

EXAMPLE I

A rare earth metals concentrate was subjected to grinding. Samples of the comminuted concentrate were subjected to a leach with a lixiviant of hydrochloric acid and magnesium chloride. The Eh of the leach was obtained by addition of sodium chlorate. Details of the concentrations of acid (expressed as normality of the acid) and chloride (expressed as mg/L), the Eh in mV of the lixiviant, temperature of the leach and the amount of the comminuted concentrate that would pass a 100 mesh screen are given in Table 1. The amount of extraction of rare earth elements plus yttrium is also given.

TABLE 1

| Run | 100 mesh % | HCl (N) | MgCl$_2$ (mg/L) | Solids (w/w) | Temp °C. | Time (hr) | REE (%) | REE + Y (%) | Eh mV |
|---|---|---|---|---|---|---|---|---|---|
| 1 | 98.7 | 5.0 | 303 | 9.5 | 95 | 4.0 | 84.4 | 79.9 | 670 |
| 2 | 86 | 5.8 | 225 | 10.0 | 95 | 24.0 | 88.5 | 83.7 | 836 |
| 3 | 80 | 5.8 | 0 | 10.9 | 95 | 4.0 | 82.2 | 77.6 | 843 |
| 4 | 80 | 5.8 | 226 | 10.2 | 70 | 4.0 | 68.0 | 66.3 | 816 |
| 5 | 80 | 5.8 | 226 | 10.2 | 105 | 4.0 | 85.3 | 80.0 | 772 |

EXAMPLE II

The procedure of Example I was repeated with a different sample of rare earth metals concentrate. The results obtained are given in Table 2.

TABLE 2

| Run | 100 mesh % | HCl (N) | MgCl$_2$ (mg/L) | Solids (w/w) | Temp °C. | Time (hr) | REE (%) | REE + Y (%) | Eh mV |
|---|---|---|---|---|---|---|---|---|---|
| 6 | 85 | 5.8 | 225 | 10.4 | 95 | 4.0 | 86.1 | 83.3 | 447 |
| 7 | 85 | 2.0 | 202 | 19.8 | 95 | 4.0 | 74.4 | 74.0 | 745 |
| 8 | 85 | 3.5 | 199 | 20.3 | 95 | 4.0 | 79.4 | 78.1 | 827 |
| 9 | 80 | 3.5 | 300 | 19.4 | 95 | 4.0 | 84.9 | 82.8 | 667 |

With respect to the results for the extraction of rare earth metals plus yttrium reported in Tables 1 and 2 (Examples I and II), the following procedure was used. The leach solution was subjected to a liquid/solids separation step. Iron was extracted from the liquid obtained by extraction with methylisobutyl ketone in solvent, as described above. The raffinate was subjected to solvent extraction using a phosphonic ester e.g. 2-ethylhexyl phosphonic acid mono-2-ethylhexylester (PC-88A or Ionquest 801); the solvent contained diluent and modifier. Free acid was removed from the raffinate obtained with an alcohol (EXXAL™ 10 branched chain alcohol) to increase the pH to greater than 1.5. Rare earth elements, including yttrium, were precipitated with 10% oxalic acid. The rare earth oxalate obtained was washed with water, dried at 100° C. and dissolved in 1:1 hydrochloric acid to give a rare earth metals concentrate. The concentrate was subjected to solvent extraction with organophosphoric acid (D2EHPA or Di-(2-ethylhexyl)phosphoric acid) to separate the rare earth elements.

The results of the runs of Tables 1 and 2 show that rare earth metals and yttrium may be extracted from a concentrate containing those elements by leaching with a lixiviant of hydrochloric acid and magnesium chloride.

EXAMPLE III

To further illustrate the procedure of Example I, leach solution was extracted with methylisobutyl ketone (MIBK) using the ratio of 20/20/60 described above, at room temperature and using an organic:aqueous ratio of 1. The extraction was for a period of 5 minutes. The result is shown in Table 3.

TABLE 3

| Fe in leach (mg/L) | Fe in raffinate (mg/L) | Extraction (%) |
|---|---|---|
| 7020 | 0.4 | 99.99 |

EXAMPLE IV

The raffinate obtained from Example III was subjected to extraction with PC 88A solution containing diluent and modifier as described herein (20/20/60) to extract zirconium. Extraction was carried out at room temperature using an organic:aqueous ratio of 1:1. The extraction was for a period of 5 minutes. The results are shown in Table 4.

TABLE 4

| Zr in Feed (mg/L) | Zr in raffinate (mg/L) | Extraction (%) |
|---|---|---|
| 3610 | 8.27 | 99.77 |

EXAMPLE V

The raffinate obtained in example III was treated for extraction of free acid using EXXAL™ 10 at room temperature at an organic:aqueous ratio of 1:1. The results obtained are shown in Table 5.

TABLE 5

| Free acid in feed (HCl) (N) | Free acid in raffinate (HCl) (N) | Extraction (%) |
|---|---|---|
| 3.1 | 0.8 | 74.2 |

What we claim is:

1. A process for the extraction of at least one rare earth element from a rare earth element-bearing ore or concentrate, comprising the steps of:
   a) leaching the rare earth element-bearing ore or concentrate with a lixiviant of hydrochloric acid and magnesium chloride at atmospheric pressure at a temperature of from 90° C. to the boiling point of the lixiviant and an Eh of at least 200 mV to obtain a leach solution; and
   b) subjecting the leach solution of step a) to a liquid/solids separation step.

2. The process of claim 1 in which liquid from step b) is subjected to steps for recovery of at least one rare earth element or yttrium.

3. The process of claim 1 in which the electric potential (Eh) is at least 400 mV.

4. The process of claim 1 in which the rare earth element is selected from at least one rare earth element of atomic number 57-71.

5. The process of claim 1 in which yttrium is recovered.

6. A process for the extraction of at least one rare earth element from a rare earth element-bearing are or concentrate, comprising the steps of:
- a) leaching the rare earth element-bearing ore or concentrate with a lixiviant of hydrochloric acid and magnesium chloride at atmospheric pressure at a temperature of from 90° C. to the boiling point of the lixiviant and an Eh of at east 200 mV to obtain a leach solution;
- b) subjecting the leach solution to a liquid/solids separation step;
- c) subjecting liquid from the liquid solids separation step of step b) to a solvent extraction step for removal of iron;
- d) subjecting raffinate obtained from step c) to a solvent extraction step to remove zirconium from the raffinate; and subjecting raffinate from step d) to steps to separate rare earth elements and yttrium.

7. The process of claim 6 in which, in step e), the raffinate is treated with oxalic acid to precipitate a compound of the at least one of the rare earth element and yttrium.

8. The process of claim 6 in which, in step a), the Eh is at least 400 mV.

9. The process of claim 7 in which the precipitate obtained is redissolved using hydrochloric acid resulting in a solution and the resulting solution is treated for recovery of at least one of a rare earth element and yttrium.

10. The process of claim 6 in which, in step e), raffinate is subjected to solvent extraction for separation of at least one rare earth element or yttrium.

11. A process for the extraction of at least one rare earth element from a rare earth element-bearing ore or concentrate, comprising the steps of:
- a) leaching the rare earth element-bearing ore or concentrate with a lixiviant of hydrochloric acid and magnesium chloride at atmospheric pressure at a temperature of from 90° C. to the holing point of the and an Eh of at least 200 my to obtain a leach solution;
- b) subjecting the each solution of Step a) to a liquid/solids separation step;
- c) subjecting liquid from the liquid/solids separation step of step b) to solvent extraction steps for removal of iron and zirconium;
- d) subjecting raffinate obtained from step c) to one of
  - A) treatment With oxalic acid followed by redissolving precipitate obtained with hydrochloric acid; or
  - B) solvent extraction for removal of rare earth elements followed by stripping with hydrochloric acid or a mixture of hydrochloric acid and magnesium chloride;
- e) subjecting raffinate from step d) to steps of solvent extraction to separate rare earth elements and yttrium.

* * * * *